United States Patent
Case, III et al.

(10) Patent No.: US 8,637,842 B2
(45) Date of Patent: Jan. 28, 2014

(54) MOBILE-MONITORING AND/OR DECONTAMINATION UNIT STRUCTURE

(75) Inventors: Leslie B. Case, III, Columbia, SC (US); Michael R. Fuller, Northampton, MA (US); Gregg A. Johnstone, Suffield, CT (US); Thomas Pearce O'Kelley, Columbia, SC (US); Glenn E. Roberts, Spring City, PA (US)

(73) Assignee: UniTech Services Group, Inc., Springfield, MA (US)

( * ) Notice: Subject to any disclaimer, the term of this patent is extended or adjusted under 35 U.S.C. 154(b) by 0 days.

(21) Appl. No.: 13/427,572

(22) Filed: Mar. 22, 2012

(65) Prior Publication Data

US 2012/0251388 A1    Oct. 4, 2012

Related U.S. Application Data

(60) Provisional application No. 61/468,193, filed on Mar. 28, 2011.

(51) Int. Cl.
*A61L 2/28* (2006.01)

(52) U.S. Cl.
USPC ............. 250/517.1; 250/363.02; 250/370.07; 250/455.11; 250/507.1; 250/515.1; 296/24.38; 376/287; 454/187; 422/119; 422/28; 4/596; 4/612; 4/900; 600/1

(58) Field of Classification Search
USPC ......... 250/507.1, 515.1, 363.02, 370.07, 374, 250/455.11, 517.1; 296/24.38; 376/287; 454/187; 422/119, 28; 4/596, 612, 900; 600/1; 976/DIG. 335
See application file for complete search history.

(56) References Cited

U.S. PATENT DOCUMENTS

| | | | |
|---|---|---|---|
| 3,567,273 A * | 3/1971 | Haas | 296/24.38 |
| 3,668,710 A * | 6/1972 | Dowd | 4/597 |
| 4,675,923 A | 6/1987 | Ashley | |
| 4,796,311 A * | 1/1989 | Shankman | 4/596 |
| 5,041,728 A | 8/1991 | Spacher et al. | |
| 5,063,924 A | 11/1991 | Galvan et al. | |
| 5,416,330 A | 5/1995 | Abul-Faraj et al. | |
| 5,507,122 A | 4/1996 | Aulson | |
| 5,551,102 A * | 9/1996 | Stewart et al. | 4/612 |
| 5,706,846 A * | 1/1998 | Sutton | 135/128 |
| 5,883,394 A * | 3/1999 | Mussman | 250/515.1 |
| 7,105,940 B2 | 9/2006 | Weesner et al. | |
| 2005/0053533 A1* | 3/2005 | Brown | 422/255 |

(Continued)

FOREIGN PATENT DOCUMENTS

| | | | | |
|---|---|---|---|---|
| DE | 2413027 A * | 9/1975 | | G01T 1/163 |
| DE | 3432282 | 3/1986 | | |

(Continued)

OTHER PUBLICATIONS

"PCM-2 Alpha/Beta Personnel Contamination Monitor" product specifications, copyright 2007.*

*Primary Examiner* — Michael Logie
(74) *Attorney, Agent, or Firm* — Holland & Bonzagni, P.C.; Mary R. Bonzagni, Esq.

(57) ABSTRACT

A method of using automatic whole body personnel contamination monitors and/or means for decontaminating individuals exposed to radioactive material contamination is provided. The inventive method involves the use of these monitors and/or decontamination means in intermodal containers of mobile-unit structures dedicated to responding to radiological emergency situations. Also provided are such mobile-unit structures, as well as systems that employ such mobile-unit structures.

31 Claims, 5 Drawing Sheets

(56) References Cited

U.S. PATENT DOCUMENTS

| | | | |
|---|---|---|---|
| 2005/0193643 A1* | 9/2005 | Pettus | 52/79.1 |
| 2007/0008149 A1* | 1/2007 | Bolling | 340/573.1 |
| 2010/0299826 A1* | 12/2010 | Grcevic | 4/599 |
| 2011/0030310 A1* | 2/2011 | Moore | 52/745.05 |
| 2012/0136196 A1* | 5/2012 | Foxall et al. | 600/21 |

FOREIGN PATENT DOCUMENTS

| | | | |
|---|---|---|---|
| DE | 20118752 | 7/2012 | |
| EP | 1522454 | 10/2009 | |
| JP | 2001281337 A | * 10/2001 | G01T 1/169 |

* cited by examiner

MOBILE-MONITORING AND/OR DECONTAMINATION UNIT STRUCTURE

RELATED APPLICATION

This application claims priority to U.S. Provisional Patent Application Ser. No. 61/468,193, filed Mar. 28, 2011, which is incorporated herein in its entirety by reference.

TECHNICAL FIELD

The present invention generally relates to a mobile-monitoring and/or decontamination unit structure, and more particularly relates to a mobile-unit structure for responding to radiological emergency situations that employs automatic whole body personnel contamination monitors for alpha and/or beta emitting contaminants and/or means for decontaminating individuals exposed to radioactive material contamination.

BACKGROUND AND SUMMARY OF THE INVENTION

Effectively responding to a nuclear crisis such as the catastrophe at Japan's Fukushima Dai-ichi nuclear power plant, or a nuclear terrorist act requires the daunting, if not impossible task of monitoring, sorting, and clearing tens to hundreds of thousands of individuals evacuated from the epicenter of the event. As will be readily appreciated, the term "monitoring" means checking a target surface for the presence of radioactive material contamination.

Radiological emergency responders would want any such evacuation to be controlled and performed in such a manner to identify any radioactive contamination and to minimize the spread of contamination. A quarantined perimeter would need to be formed to achieve this goal. The population would need to be individually monitored for radiological contamination at the perimeter and then channeled for appropriate action depending upon the result of monitoring. Long delays in this process would increase the amount of time radioactive material remains on contaminated individuals thus increasing the dose to these individuals and as time passes in any such emergency there is a danger of public hysteria and panic.

Current technology used by radiological emergency responders involves the use of portable battery-operated hand-held instrumentation which necessitates monitoring of a person's entire body with a small probe. Typical probe areas are 12 to 100 square centimeters (i.e., 2 to 16 square inches). An appropriate and complete whole body survey utilizing such instrumentation would require 3 to 5 minutes per person and would also require dedicated professionals skilled in the use of the instrumentation. Accordingly, 12 to 20 individuals could be surveyed per hour per instrument. Hand-held instruments would be used because faster whole body scanning instruments are ordinarily not sufficiently mobile to be moved quickly into position for use in responding to emergencies. Furthermore, they are not readily available and procurement involves long lead times.

There is a need to greatly improve the efficiency and speed of radiological triage in these radiological emergency situations.

The present invention fulfills this need by providing a method of using automatic whole body personnel contamination monitors and/or means for decontaminating individuals exposed to radioactive material contamination, the method comprising using the monitors and/or decontamination means in mobile-unit structures dedicated to responding to radiological emergency situations.

The present invention further fulfills this need by providing a mobile-unit structure for responding to radiological emergency situations that comprises an intermodal container, and contained therein at least one of:
  (a) one or more automatic whole body personnel contamination monitors for alpha and/or beta emitting radioactive material contaminants; and
  (b) means for decontaminating individuals exposed to radioactive material contamination.

The present invention also provides a system for responding to radiological emergency situations that comprises a plurality of the mobile-unit structures described above.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which.

DETAILED DESCRIPTION OF THE INVENTION

Figure 1:
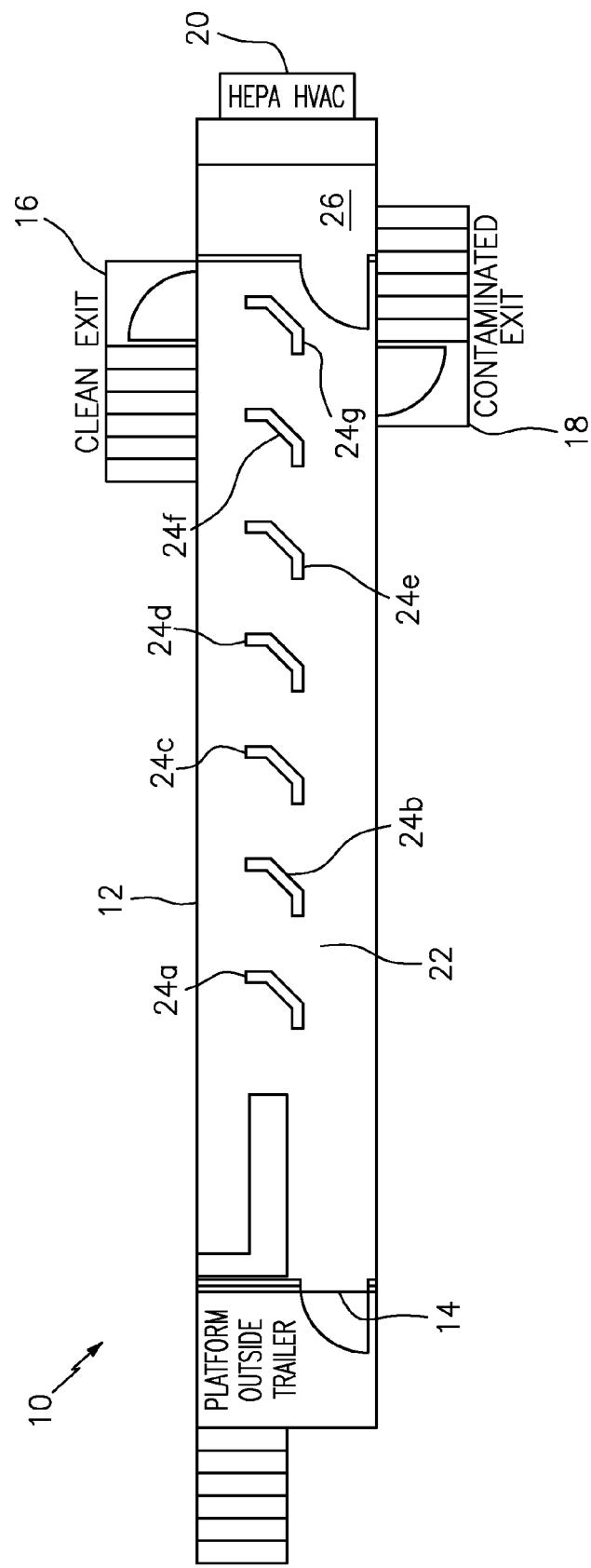
FIG. 1 is a top plan view of an exemplary embodiment of the mobile-unit structure for responding to radiological emergency situations of the present invention, which contains a plurality of automatic whole body personnel contamination monitors positioned along a centerline within the container.

The mobile-monitoring and/or decontamination-unit structure of the present invention is stored in ready condition and requires minimal site assembly and setup. The mobility of the inventive unit structure is essential as the location of a nuclear crisis cannot be accurately predicted. Moreover, due to the expense of radioactive material contamination monitoring and decontamination instruments and equipment, it is not reasonable to have the capability for population monitoring and decontamination at every possible site of potential need.

In an exemplary embodiment, the inventive mobile-unit structure employs one or more automatic whole body personnel contamination monitors for alpha and/or beta emitting contaminants. These automatic whole body personnel contamination monitors (i.e., Automatic Personnel Monitors (APMs) or Portal Monitors (PMs)) effectively monitor an entire person (front then back sequentially) in a few seconds. A typical PM survey involves approximately 15 seconds per person. Accordingly, 240 individuals could be surveyed per hour per instrument. This results in increased reliability as well as efficiency in terms of time (up to 20 times faster) over the conventional technology. As will be readily appreciated, human factors render hand-monitoring less reliable due to the tendency to miss areas on monitored surfaces.

In a further exemplary embodiment, the inventive unit structure further employs means for decontaminating individuals exposed to radioactive material contamination.

In either of the above-referenced exemplary embodiments, the one or more intermodal containers of the mobile-unit structure contain one or more automatic whole body personnel contamination monitors for alpha and/or beta emitting contaminants. These PMs are preferably positioned along a centerline or outside wall of the container, and may be separated from adjacent PMs by partitions made from gamma ray shielding materials. As will be readily appreciated by those skilled in the art, these partitions would prevent a highly radioactive individual in one PM from affecting the count of another individual in another PM.

The PMs may each be provided with a special counting routine which allows each monitor to also count removable contamination on floor smears. Floor smears would be collected on disposable wipes (e.g., 3 inch×6 inch disposable wipes) designed to be wiped on the floor to collect any contamination. The disposable wipe with collected floor contamination would then be placed on the PM, and the special counting routine on the PM would then determine if significant contamination had been picked up on the disposable wipe. Thus, the PMs in this exemplary embodiment can be used to determine if the container floor has become contaminated by the transfer of contamination from contaminated individuals. Alternatively, the floors in each intermodal container, which are preferably constructed of materials that are easy to decontaminate such as stainless steel or polyurethane, could be checked for contamination by direct measurement with hand-held portable radiation detection instruments, or by wiping the floor with a disposable wipe (e.g., a standard 2 inch diameter circular wipe or smear, or swipe) and then counting the circular wipe or disk in a fixed counting device such as an Alpha/Beta Sample Counter, Model No. 2929, available from Ludlum Measurements, Inc., 501 Oak Street, Sweetwater, Tex. 79556 USA, or its equivalent.

In the second above-referenced exemplary embodiment, the one or more intermodal containers of the mobile-unit structure also contain means for decontaminating individuals exposed to radioactive material contamination. Means for decontamination or decontamination capability may take the form of changing rooms and decontamination showers (e.g., pass through showers), which may or may not be present as one or more integrated changing room/shower units within the intermodal container of the inventive unit structure. Each changing room would be equipped with clean uncontaminated clothing.

Additional internal components or contents that may be included within each intermodal container of each mobile-unit structure include:

tacky mats or step-off pads, which would be placed at the entrance of the container. As is well known to those skilled in the art, a tacky mat is typically an 18 inch by 3 foot cardboard substrate covered with multiple layers of tacky plastic. As individuals cross the mat on foot, the mat collects contamination from the individual's feet, preventing it from being spread on the floor of the container beyond the location of the tacky mat. As the tacky mat loses its tackiness, the plastic sheets are peeled off revealing a fresh tacky surface;

pre-screening means including, but not limited to, portal monitors, hand and/or foot detectors, plastic scintillator detectors, and gas flow proportional counting detectors for quantifying alpha and beta activity, which are operated using P-10 gas (i.e., a mixture of approximately 90% argon and 10% methane), or other suitable gas mixture. The foot detectors may be covered with replaceable thin plastic material (e.g., SARAN® plastic sheets) allowing for detection of contamination while preventing contamination of the detectors by materials released from the feet of individuals;

computerized data systems for tracking individuals entering the container using known tagging techniques (e.g., indelible stamps, radio frequency identification (RFID), bar codes, bracelets, necklaces, or the like), such tracking including the receipt and storage of results from any pre-screening conducted on a tagged individual and from the PM that monitored the individual;

heating, cooling, circulation and filtration means including, but not limited to, heating, ventilation and air conditioning (HVAC) and filtration (e.g., high efficiency particulate air (HEPA) filtration) systems that are designed to minimize the potential for airborne contamination, facilitate radiological cleanliness, and reduce downtime due to contamination by using various air flow designs, which may include the use of floor grating suction, and filtered air. It is noted here that an advantage of controlling the temperature within the mobile-unit structure of the present invention is the minimalization of any change in the pore size of a contaminated individual's skin. Changing the pore size when radioactive contamination is present, as might occur when an individual moves from a warm environment to a cold environment, can result in contamination being trapped in the skin pores resulting in resistance to decontamination. In addition to the above, and as will be readily appreciated, the heating, cooling, circulation and filtration means described herein includes means for maintaining air pressure within the container lower than the air pressure outside the container, which results in an inward only direction of air flow;

ventilation dampers, which allow several containers to be connected to fixed ventilation systems in series during storage to maintain the internal components and contents in good working condition;

one or more water pumps and water heaters; and utility service connections adaptable to a variety of electrical, water supply, and waste water discharge modalities, or self-contained means for electricity generation, portable water storage and supply, and waste water filtration or retention.

In addition to the above, one or more areas for health physics (HP) support may be provided within each intermodal container of each mobile-unit structure including a place for qualified attendants and supplies.

The one or more intermodal containers are heavy duty containers that may be shielded for radiation protection. The containers have a movable or mobile platform, the platform including four or more support jacks or leveling legs extending there from to permit leveling the container on uneven surfaces. Containers having a movable platform are suitable for transportation involving more than one form of carrier, such as truck and rail, or truck, ship, and rail. These containers may also be air-lifted by helicopter when evacuation precludes delivery by truck or rail. Fixed or removable rigging (e.g., lifting eyes) may be positioned underneath or on the intermodal container to facilitate air-lifting by helicopter. Containers having a mobile platform are constructed in accordance with standard roadway trailer specifications so that the mobile containers or trailers may also be lawfully operated on roadways.

The one or more intermodal containers may also be fitted with high power scanning search lights to make them easy to locate in darkness in an emergency situation.

Referring now to FIG. 1 of the drawings, an exemplary embodiment of the mobile-unit structure of the present invention is shown generally at 10. Mobile-unit structure 10 basically comprises: an intermodal container 12 having an entrance 14, a "clean" exit 16, and a "contaminated" exit 18, an air handling (HVAC) and air filtration (HEPA) system 20, a monitoring area 22 containing a plurality of automatic whole body personnel contamination monitors 24a-g positioned along a centerline of the monitoring area, and an HP support area 26. Potentially contaminated individuals enter container 12 at entrance 14 and then proceed along one side of container 12 until they reach an available monitor 24. The individual steps into the available monitor 24 and is checked for radioactive material contamination. If contaminated, the individual exits container 12 by walking toward "contaminated" exit 18 along the same side of the container as when s/he entered. If not contaminated, the individual proceeds toward "clean" exit 16 along a side opposite from the side on which s/he entered. This configuration minimizes cross contamination that might occur if individuals verified to be free of contamination by monitor 24 were to cross the paths of contaminated individuals. Preferably, the floor within container 12 is labeled showing the direction in which individuals are to proceed. Insofar as possible, barricades and railings are used to prevent these individuals from taking improper routes through container 12.

While monitors 24a-g are shown in FIG. 1 as being positioned at an angle along a centerline of the monitoring area 22 of container 12, these monitors may assume any orientation and may be positioned anywhere within the monitoring area 22, including along an outside wall of container 12.

Figure 2:
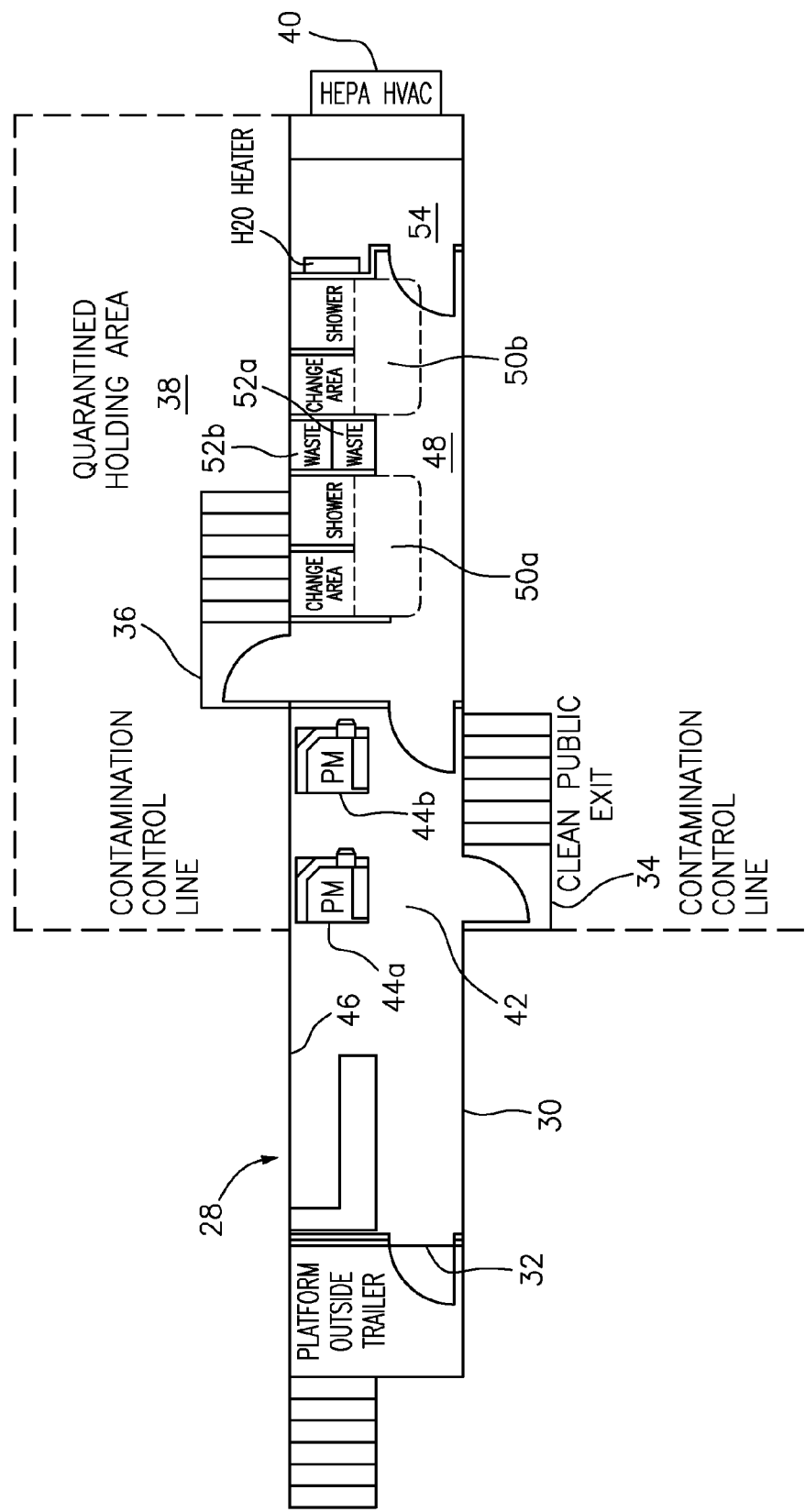
FIG. 2 is a top plan view of another exemplary embodiment of the mobile-unit structure of the present invention, which contains two automatic whole body personnel contamination monitors and two changing room and decontamination shower units positioned along a wall of the container.

In FIG. 2, another exemplary embodiment of the inventive mobile-unit structure is shown generally at 28. Mobile-unit structure 28 is made up of an intermodal container 30 having an entrance 32, a "clean" exit 34, and a "quarantine" exit 36 that leads to a quarantined holding area 38, a HVAC/HEPA system 40, a monitoring area 42 containing two automatic whole body personnel contamination monitors 44a,b positioned along an outside wall 46 of container 30, a decontamination area 48 containing two integrated changing room/shower units 50a,b, and waste collection areas 52a,b, positioned along wall 46, and an HP support area 54. Potentially contaminated individuals enter container 30 at entrance 32 and then proceed along one side of container 30 until they reach an available monitor 44, where they are checked for radioactive material contamination. If contaminated, the individual proceeds to the decontamination area 48, enters an integrated changing room/shower unit 50 where s/he removes contaminated clothing, showers, dresses in clean uncontaminated clothing, and then returns to monitoring area 42 for re-monitoring. After re-monitoring, if the individual is still contaminated, s[he] exits container 30 through "quarantine" exit 36 into the quarantined holding area 38. If not contaminated, the individual proceeds toward "clean" exit 34.

Figure 3:
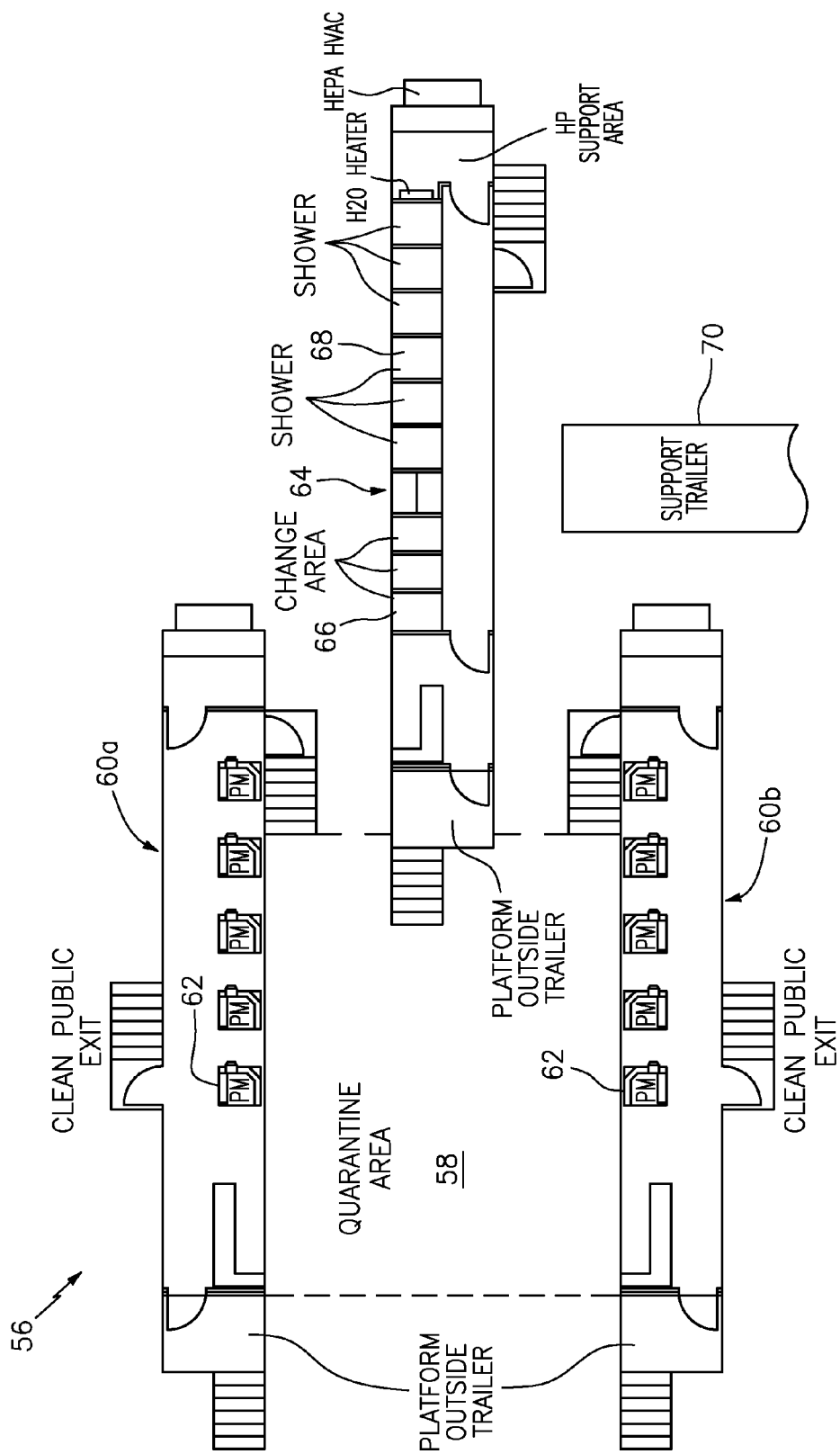
FIG. 3 is a top plan view of an exemplary embodiment of the system for responding to radiological emergency situations of the present invention, which comprises: three mobile-unit structures configured so as to define a quarantine area, two such mobile-unit structures being mobile-monitoring-unit structures containing a plurality of automatic whole body personnel contamination monitors, and one such mobile-unit structure being a mobile-decontamination-unit structure containing a plurality of changing rooms and decontamination showers; and one "support" unit structure providing power generation, water and waste storage, and supplies (e.g., clothing, towels)

In FIG. 3, an exemplary embodiment of the system for responding to radiological emergency situations of the present invention is shown generally at 56. System 56 comprises three mobile-unit structures configured so as to define a quarantine area 58, the unit structures including two mobile-monitoring-unit structures 60a,b containing a plurality of automatic whole body personnel contamination monitors 62, and one mobile-decontamination-unit structure 64 containing, among other things, a plurality of changing rooms 66 and a plurality of decontamination showers 68. A separate "support" unit structure 70 is also shown that contains an electrical generator, a water storage tank, waste storage, and replacement clothing for several thousand individuals among other supplies. Such a "support" unit structure may or may not be needed depending upon the exigencies of the situation.

In system 56, potentially contaminated individuals enter either mobile-monitoring-unit structure 60a or mobile-monitoring-unit structure 60b at their respective entrances where they are checked for radioactive material contamination. If contaminated, individuals exit the mobile-monitoring-unit structure through its "contaminated" exit, walk through quarantine area 58, and into mobile-decontamination-unit structure 64, where they are decontaminated. If not contaminated, individuals proceed toward the "clean" exit of the mobile-monitoring-unit structure 60a or 60b.

Figure 4:
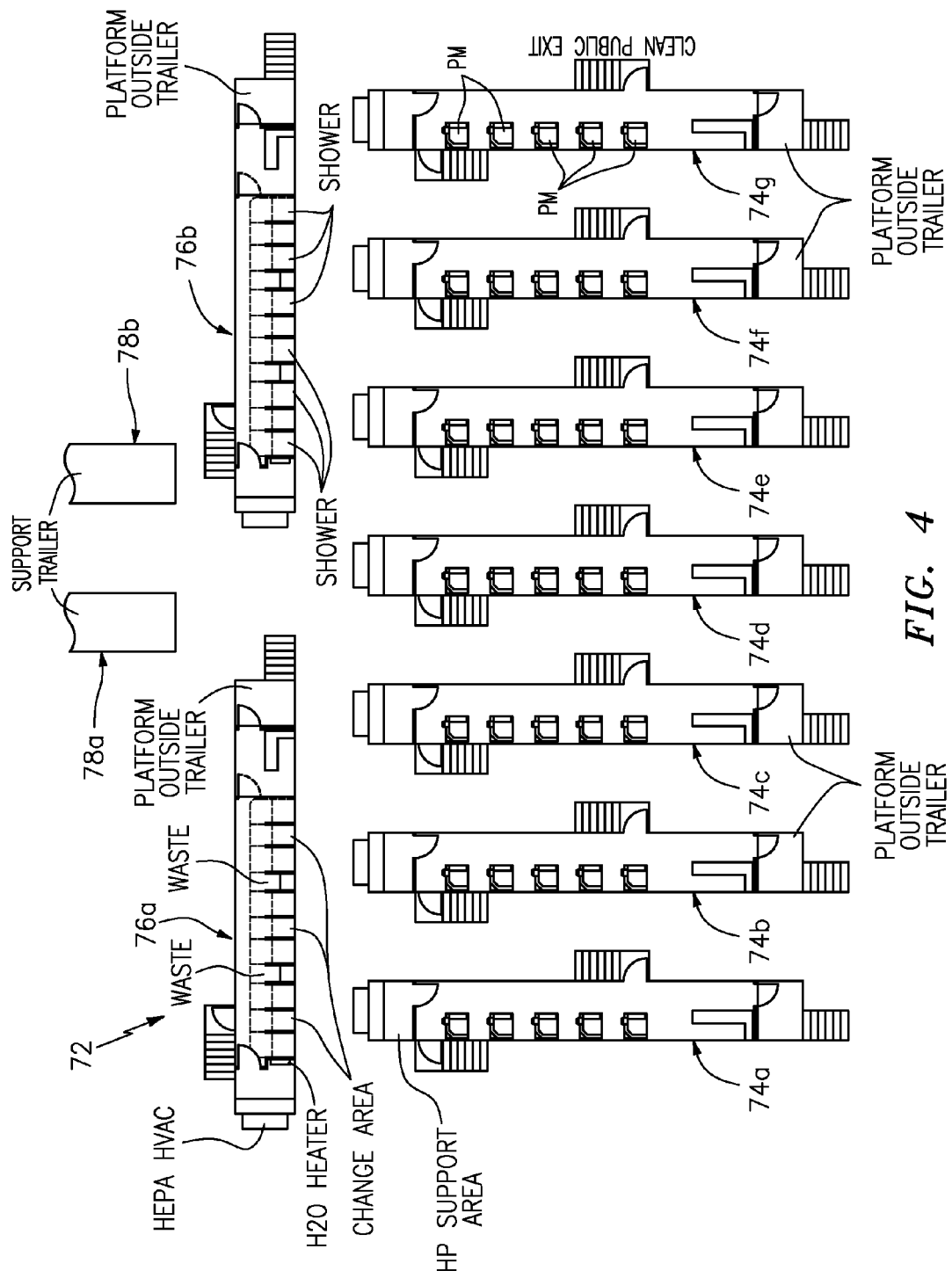
FIG. 4 is a top plan view of another exemplary embodiment of the inventive system, which comprises: nine mobile-unit structures, seven of which are mobile-monitoring-unit structures positioned in parallel relationship to each other, each containing a plurality of automatic whole body personnel contamination monitors positioned along an outside wall thereof, and two of which are mobile-decontamination-unit structures positioned at right angles to the parallel structures, each containing a plurality of changing rooms and decontamination showers; and two "support" unit structures.

In FIG. 4, another exemplary embodiment of the inventive system is shown generally at 72. System 72 comprises seven mobile-monitoring-unit structures 74a-g arranged in parallel relationship to one another, two mobile-decontamination-unit structures 76a,b arranged at right angles to the mobile-monitoring-unit structures, and two separate "support" unit structures 78a,b. In system 72, potentially contaminated individuals enter one of the mobile-monitoring-unit structures 74 inside which they are checked for radioactive material contamination. If contaminated, individuals exit the mobile-monitoring-unit structure through its "contaminated" exit and walk into one of the mobile-decontamination-unit structures 76, where they are decontaminated. If not contaminated, individuals proceed toward the "clean" exit of the mobile-monitoring-unit structure.

Figure 5:
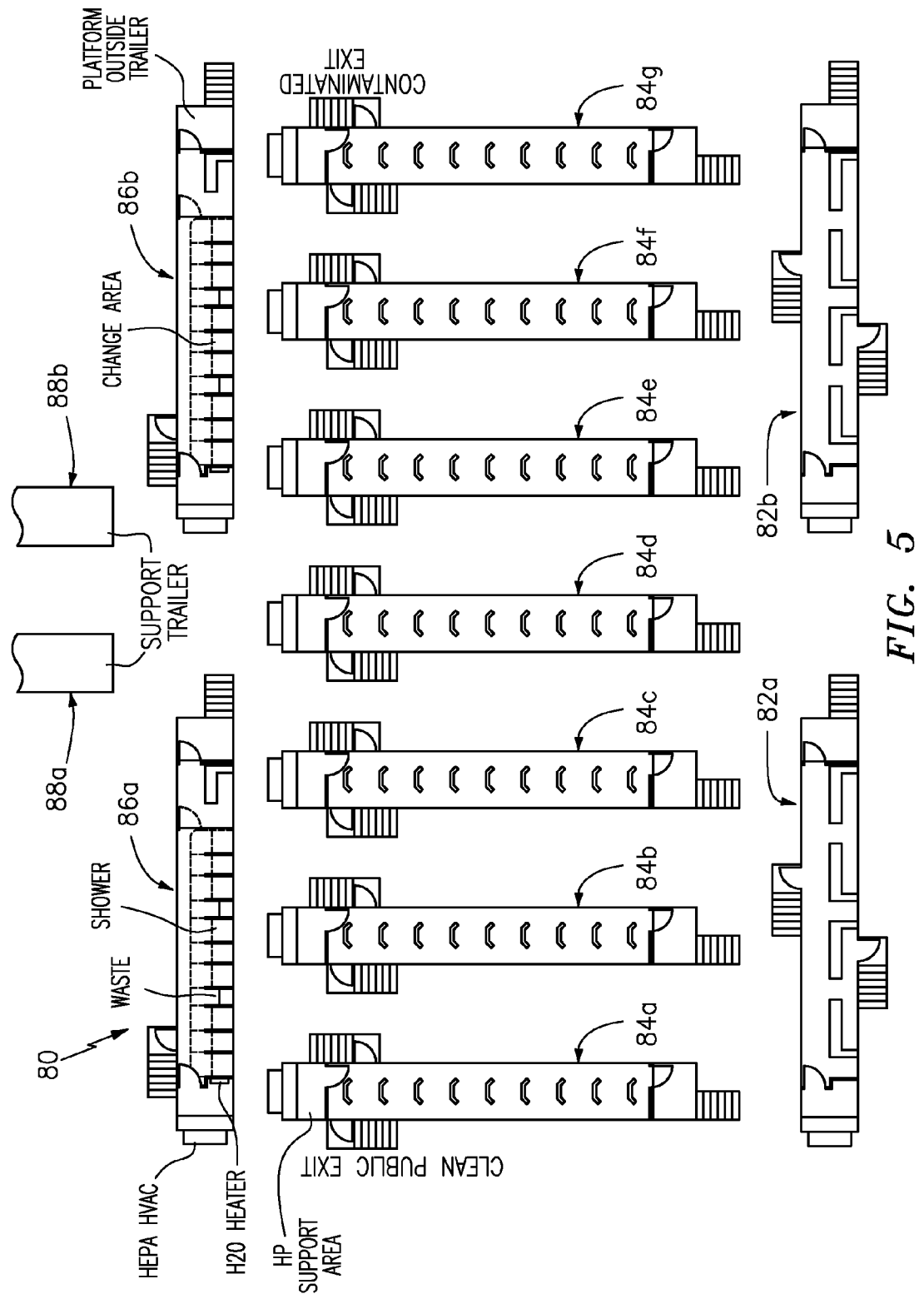
FIG. 5 is a top plan view of another exemplary embodiment of the inventive system, which in addition to the unit structures shown in FIG. 4, further comprises two "mockup" unit structures used to train individuals in the operation of the automatic whole body personnel contamination monitors before the individuals reach the actual devices so as to reduce the occupancy time and to increase overall system throughput.

In FIG. 5, yet another exemplary embodiment of the inventive system is shown generally at 80. System 80 comprises two "mock-up" unit structures 82*a,b*, seven mobile-monitoring-unit structures 84*a-g* arranged in parallel relationship to one another and at right angles to the "mockup" unit structures 82*a,b*, two mobile-decontamination-unit structures 86*a, b,* and two separate "support" unit structures 88*a,b*. As noted above, the "mock-up" unit structures 82*a,b*, are used to train individuals in the operation of the automatic whole body personnel contamination monitors before they enter a mobile-monitoring-unit structure 84 so as to reduce the occupancy time and to increase the number of individuals monitored, or monitored and decontaminated by system 80 for any given period of time. Training is accomplished by having individuals stand in low cost mock-ups of Automatic Personnel Monitors (APMs) and orienting their bodies in a manner similar to that required during actual monitoring. As will be readily appreciated by those skilled in the art, mock-up training will reduce the time required to monitor individuals because the APMs do not start and run through a counting cycle until after the individual being monitored is correctly positioned and stationary.

The modular approach implemented by the inventive system allows the system to match facilities with the magnitude of the catastrophe. Moreover, the designs shown in the drawings maximize throughput and minimize radiological hazards.

While various embodiments of the present invention have been described above, it should be understood that they have been presented by way of example only, and not limitation. Thus, the breadth and scope of the present invention should not be limited by any of the exemplary embodiments.

What is claimed is:

1. A mobile-unit structure dedicated to responding to radiological emergency situations, which comprises an intermodal container having contained therein:
   (a) more than one automatic whole body personnel contamination monitor for alpha and/or beta emitting contaminants; and optionally
   (b) means for decontaminating individuals exposed to radioactive material contamination,
   wherein the monitors are separated from adjacent monitors by partitions made from gamma ray shielding materials.

2. The mobile-unit structure of claim 1, wherein either a movable or mobile platform is positioned underneath the intermodal container.

3. The mobile-unit structure of claim 2, wherein the platform includes four or more support jacks or leveling legs extending there from to permit leveling the container on uneven surfaces.

4. The mobile-unit structure of claim 1, wherein the intermodal container is shielded for radiation protection.

5. The mobile-unit structure of claim 1, wherein the automatic whole body personnel contamination monitors are positioned along either a centerline or outside wall of the intermodal container.

6. The mobile-unit structure of claim 1, wherein the automatic whole body personnel contamination monitors are provided with a counting routine which allows the monitors to also count removable contamination on floor smears.

7. The mobile-unit structure of claim 1, wherein the intermodal container also contains means for decontaminating individuals exposed to radioactive material contamination.

8. The mobile-unit structure of claim 7, wherein the means for decontaminating individuals exposed to radioactive material contamination comprises changing rooms and decontamination showers, which may optionally be present as one or more integrated changing room/shower units.

9. The mobile-unit structure of claim 1, wherein the intermodal container also contains a tacky mat or step-off pad placed at an entrance of the container.

10. The mobile-unit structure of claim 1, wherein the intermodal container also contains pre-screening means selected from the group of portal monitors, hand and/or foot detectors, plastic scintillator detectors, and gas flow proportional counting detectors for quantifying alpha and beta activity.

11. The mobile-unit structure of claim 1, wherein the intermodal container also contains computerized data systems for tracking individuals entering the container.

12. The mobile-unit structure of claim 1, wherein the intermodal container also contains heating, cooling, circulation and filtration means selected from the group of heating, ventilation and air conditioning systems and filtration systems.

13. The mobile-unit structure of claim 1, wherein the intermodal container also contains one or more ventilation dampers, water pumps, water heaters, utility service connections, self-contained means for electricity generation, portable water storage and supply, waste water filtration or retention, or combinations thereof.

14. The mobile-unit structure of claim 1, wherein the intermodal container also contains one or more areas for health physics support.

15. The mobile-unit structure of claim 1, wherein the intermodal container has an entrance, a clean exit, and a contaminated exit, and contains an air handling and air filtration system, a monitoring area containing a plurality of the automatic whole body personnel contamination monitors positioned along a centerline of the monitoring area, and a health physics support area.

16. The mobile-unit structure of claim 1, wherein the intermodal container has an entrance, a clean exit, and a quarantine exit that leads to a quarantined holding area, and contains an air handling and air filtration system, a monitoring area containing a plurality of the automatic whole body personnel contamination monitors, a decontamination area containing integrated changing room/shower units, waste collection areas, and a health physics support area.

17. The mobile-unit structure of claim 1, wherein fixed or removable rigging is positioned underneath or on the intermodal container to facilitate air-lifting by helicopter.

18. The mobile-unit structure of claim 1, wherein the intermodal container is fitted with one or more high power scanning search lights to make it easy to locate in darkness in an emergency situation.

19. A system for responding to radiological emergency situations that comprises a plurality of mobile-unit structures, each mobile-unit structure comprising an intermodal container having contained therein:
   (a) more than one automatic whole body personnel contamination monitor for alpha and/or beta emitting contaminants; and optionally
   (b) means for decontaminating individuals exposed to radioactive material contamination,
   wherein the monitors are separated from adjacent monitors by partitions made from gamma ray shielding materials.

20. The system of claim 19, which comprises: three mobile-unit structures configured to define a quarantine area, wherein two mobile-unit structures are mobile-monitoring-unit structures that each contain a plurality of automatic whole body personnel contamination monitors, and wherein one mobile-unit structure is a mobile-decontamination-unit structure that contains a plurality of changing rooms and decontamination showers; and optionally, a support unit structure that contains an electrical generator, a water storage tank, waste storage, and replacement clothing.

21. The system of claim 19, which comprises: seven mobile-unit structures that are arranged in parallel relationship to one another, wherein each mobile-unit structure is a mobile-monitoring-unit structure containing a plurality of automatic whole body personnel contamination monitors; two mobile-unit structures that are arranged at right angles to the seven parallel mobile-monitoring-unit structures, wherein each mobile-unit structure is a mobile-decontamination-unit structure that contains a plurality of changing rooms and decontamination showers; and two support unit structures that each contain an electrical generator, a water storage tank, waste storage, and replacement clothing.

22. A system for responding to radiological emergency situations that comprises a plurality of mobile-unit structures, each mobile-unit structure comprising an intermodal container having contained therein at least one of:
    (a) one or more automatic whole body personnel contamination monitors for alpha and/or beta emitting contaminants; and
    (b) means for decontaminating individuals exposed to radioactive material contamination,
    which comprises: seven mobile-unit structures that are arranged in parallel relationship to one another, wherein each mobile-unit structure is a mobile-monitoring-unit structure containing a plurality of automatic whole body personnel contamination monitors; two mobile-unit structures that are arranged at right angles to the seven parallel mobile-monitoring-unit structures, wherein each mobile-unit structure is a mobile-decontamination-unit structure that contains a plurality of changing rooms and decontamination showers; and two support unit structures that each contain an electrical generator, a water storage tank, waste storage, and replacement clothing,
    which further comprises one or more mock-up unit structures that contain means for training individuals in the operation of the automatic whole body personnel contamination monitors, said means constituting mock-ups of automatic personnel monitors designed to teach users how to properly position themselves within these monitors.

23. A method of using automatic whole body personnel contamination monitors and optionally means for decontaminating individuals exposed to radioactive material contamination, the method comprising using the monitors and optionally the decontamination means in mobile-unit structures dedicated to responding to radiological emergency situations, wherein the monitors are separated from adjacent monitors in the mobile-unit structures by partitions made from gamma ray shielding materials.

24. A method for monitoring and/or decontaminating individuals exposed to radioactive material contamination, the method comprising:
    providing a mobile-unit structure dedicated to responding to radiological emergency situations, which comprises an intermodal container having contained therein at least one of:
    (a) one or more automatic whole body personnel contamination monitors for alpha and/or beta emitting contaminants; and
    (b) means for decontaminating individuals exposed to radioactive material contamination,
    wherein the intermodal container has an entrance, a clean exit, and a contaminated exit, and contains an air handling and air filtration system, a monitoring area containing a plurality of the automatic whole body personnel contamination monitors positioned along a centerline of the monitoring area, and a health physics support area;
    arranging for potentially contaminated individuals to enter the intermodal container of the mobile-unit structure at the entrance, to proceed along one side of the container until they reach an available monitor, and to step inside the available monitor;
    checking each potentially contaminated individual for radioactive material contamination;
    arranging for each contaminated individual to exit the container by walking toward its contaminated exit along the same side of the container on which the individual entered; and
    arranging for each non-contaminated individual to exit the container by walking toward its clean exit along a side opposite from the side on which the non-contaminated individual entered.

25. A method for monitoring and/or decontaminating individuals exposed to radioactive material contamination, the method comprising:
    providing a mobile-unit structure dedicated to responding to radiological emergency situations, which comprises an intermodal container having contained therein at least one of:
    (a) one or more automatic whole body personnel contamination monitors for alpha and/or beta emitting contaminants; and
    (b) means for decontaminating individuals exposed to radioactive material contamination,
    wherein the intermodal container has an entrance, a clean exit, and a quarantine exit that leads to a quarantined holding area, and contains an air handling and air filtration system, a monitoring area containing a plurality of the automatic whole body personnel contamination monitors, a decontamination area containing integrated changing room/shower units, waste collection areas, and a health physics support area;
    arranging for potentially contaminated individuals to enter the intermodal container of the mobile-unit structure at its entrance, to proceed along one side of the container until they reach an available monitor, and to step inside the available monitor;
    checking each potentially contaminated individual for radioactive material contamination;
    arranging for each contaminated individual to proceed to the decontamination area, to enter an integrated changing room/shower unit where the individual will remove contaminated clothing, shower, and then dress in clean uncontaminated clothing, and then to exit the container through its quarantine exit into the quarantined holding area; and
    arranging for each non-contaminated individual to exit the container by walking toward its clean exit.

26. A method for monitoring and/or decontaminating individuals exposed to radioactive material contamination, the method comprising:
    providing a system for responding to radiological emergency situations that comprises a plurality of mobile-unit structures, each mobile-unit structure comprising an intermodal container having contained therein at least one of:

(a) one or more automatic whole body personnel contamination monitors for alpha and/or beta emitting contaminants; and
(b) means for decontaminating individuals exposed to radioactive material contamination,
which comprises: three mobile-unit structures configured to define a quarantine area, wherein two mobile-unit structures are mobile-monitoring-unit structures that each contain a plurality of automatic whole body personnel contamination monitors, and wherein one mobile-unit structure is a mobile-decontamination-unit structure that contains a plurality of changing rooms and decontamination showers; and optionally, a support unit structure that contains an electrical generator, a water storage tank, waste storage, and replacement clothing;
arranging for potentially contaminated individuals to enter the intermodal container of one of the mobile-monitoring-unit structures at its entrance, to proceed along one side of the container until they reach an available monitor, and to step inside the available monitor;
checking each potentially contaminated individual for radioactive material contamination;
arranging for each contaminated individual to exit the intermodal container through its contaminated exit, to walk through the quarantine area, and then to enter the intermodal container of the mobile-decontamination-unit structure at its entrance, and once inside, to enter a changing room where the individual will remove contaminated clothing, to enter a decontamination shower where the individual will shower, and then to re-enter the changing room where the individual will dress in clean uncontaminated clothing, and then to exit the container through its decontaminated exit; and
arranging for each non-contaminated individual to exit the container by walking toward its clean exit.

27. A method for monitoring and/or decontaminating individuals exposed to radioactive material contamination, the method comprising:
providing a system responding to radiological emergency situations that comprises a plurality of mobile-unit structures, each mobile-unit structure comprising an intermodal container having contained therein at least one of:
(a) one or more automatic whole body personnel contamination monitors for alpha and/or beta emitting contaminants; and
(b) means for decontaminating individuals exposed to radioactive material contamination,
which comprises: seven mobile-unit structures that are arranged in parallel relationship to one another, wherein each mobile-unit structure is a mobile-monitoring-unit structure containing a plurality of automatic whole body personnel contamination monitors; two mobile-unit structures that are arranged at right angles to the seven parallel mobile-monitoring-unit structures, wherein each mobile-unit structure is a mobile-decontamination-unit structure that contains a plurality of changing rooms and decontamination showers; and two support unit structures that each contain an electrical generator, a water storage tank, waste storage, and replacement clothing;
arranging for potentially contaminated individuals to enter the intermodal container of one of the mobile-monitoring-unit structures at the entrance, to proceed along one side of the container until they reach an available monitor, and to step inside the available monitor;
checking each potentially contaminated individual for radioactive material contamination;
arranging for each contaminated individual to exit the intermodal container through its contaminated exit, to enter the intermodal container of one of the mobile-decontamination-unit structures, and once inside, to enter a changing room where the individual will remove contaminated clothing, to enter a decontamination shower where the individual will shower, and then to re-enter the changing room where the individual will dress in clean uncontaminated clothing, and then to exit the container through its decontaminated exit; and
arranging for each non-contaminated individual to exit the container by walking toward its clean exit.

28. A method for monitoring and/or decontaminating individuals exposed to radioactive material contamination, the method comprising:
providing a system for responding to radiological emergency situations that comprises a plurality of mobile-unit structures, each mobile-unit structure comprising an intermodal container having contained therein at least one of:
(a) one or more automatic whole body personnel contamination monitors for alpha and/or beta emitting contaminants; and
(b) means for decontaminating individuals exposed to radioactive material contamination,
which comprises: seven mobile-unit structures that are arranged in parallel relationship to one another, wherein each mobile-unit structure is a mobile-monitoring-unit structure containing a plurality of automatic whole body personnel contamination monitors; two mobile-unit structures that are arranged at right angles to the seven parallel mobile-monitoring-unit structures, wherein each mobile-unit structure is a mobile-decontamination-unit structure that contains a plurality of changing rooms and decontamination showers; and two support unit structures that each contain an electrical generator, a water storage tank, waste storage, and replacement clothing,
which further comprises one or more mock-up unit structures that contain means for training individuals in the operation of the automatic whole body personnel contamination monitors, said means constituting mock-ups of automatic personnel monitors designed to teach users how to properly position themselves within these monitors;
arranging for potentially contaminated individuals to enter one of the mock-up unit structures where each individual will receive mock-up training on how to operate the automatic whole body personnel contamination monitors;
arranging for trained potentially contaminated individuals to enter the intermodal container of one of the mobile-monitoring-unit structures at its entrance, to proceed along one side of the container until they reach an available monitor, and to step inside the available monitor;
checking each potentially contaminated individual for radioactive material contamination;
arranging for each contaminated individual to exit the intermodal container through its contaminated exit, to enter the intermodal container of one of the mobile-decontamination-unit structures, and once inside, to enter a changing room where the individual will remove contaminated clothing, to enter a decontamination shower where the individual will shower, and then to re-enter the changing room where the individual will dress in clean uncontaminated clothing, and then to exit the container through its decontaminated exit; and arranging for each non-contaminated individual to exit the container by walking toward its clean exit.

29. A mobile-unit structure dedicated to responding to radiological emergency situations, which comprises a container having contained therein:
 (a) more than one automatic whole body personnel contamination monitor for alpha and/or beta emitting contaminants; and optionally
 (b) means for decontaminating individuals exposed to radioactive material contamination,
 wherein the monitors are separated from adjacent monitors by partitions made from radiation shielding materials.

30. A system for responding to radiological emergency situations that comprises a plurality of mobile-unit structures, each mobile-unit structure comprising a container having contained therein:
 (a) more than one automatic whole body personnel contamination monitor for alpha and/or beta emitting contaminants; and optionally
 (b) means for decontaminating individuals exposed to radioactive material contamination,
 wherein the monitors are separated from adjacent monitors by partitions made from radiation shielding materials.

31. A method of using automatic whole body personnel contamination monitors and optionally means for decontaminating individuals exposed to radioactive material contamination, the method comprising using the monitors and optionally the decontamination means in mobile-unit structures dedicated to responding to radiological emergency situations, wherein the monitors are separated from adjacent monitors in the mobile-unit structures by partitions made from radiation shielding materials.

* * * * *